US008224396B2

(12) United States Patent
Kim et al.

(10) Patent No.: US 8,224,396 B2
(45) Date of Patent: Jul. 17, 2012

(54) WIRELESS SPEAKER

(75) Inventors: Ji-Hee Kim, Gyeonggi-Do (KR); Jung-Whan Kuh, Seoul (KR); Je-Wook Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 399 days.

(21) Appl. No.: 12/508,519

(22) Filed: Jul. 23, 2009

(65) Prior Publication Data

US 2010/0190443 A1 Jul. 29, 2010

(30) Foreign Application Priority Data

Jan. 23, 2009 (KR) ........................ 30-2009-0003195

(51) Int. Cl.
*H04M 1/00* (2006.01)

(52) U.S. Cl. .................................. 455/569.1; 455/575.1

(58) Field of Classification Search ............... 455/550.1, 455/569.1, 575.1, 575.2, 575.3, 575.4, 575.8, 455/90.3; 361/679.01, 679.02, 679.12, 679.23, 361/679.28; 381/55; 181/199
See application file for complete search history.

(56) References Cited

U.S. PATENT DOCUMENTS

| | | | | |
|---|---|---|---|---|
| 6,766,175 B2 * | 7/2004 | Uchiyama | ..................... | 455/462 |
| 2009/0156263 A1 * | 6/2009 | Park et al. | ..................... | 455/566 |
| 2009/0280871 A1 * | 11/2009 | Hofer et al. | ..................... | 455/573 |
| 2010/0042671 A1 * | 2/2010 | Natt et al. | ..................... | 709/203 |

* cited by examiner

*Primary Examiner* — Ping Hsieh

(74) *Attorney, Agent, or Firm* — Lee, Hong, Degerman, Kang & Waimey

(57) ABSTRACT

An apparatus includes first and second rod-shaped bodies and a first hinge unit configured to rotatably couple the first and second rod-shaped bodies. Each of the first and second rod shaped bodies includes a speaker positioned on a longitudinal side thereof and is structured to include at least one curved portion proximate to a first end thereof. The first hinge unit is configured to rotatably couple the first and second rod-shaped bodies, such that an end of the at least one curved portion of the first rod-shaped body faces an end of the at least one curved portion of the second rod-shaped body to form a continuous body having an axis therethrough. The first hinge unit permits relative rotational movement between the first and second rod-shaped bodies.

15 Claims, 7 Drawing Sheets

WIRELESS SPEAKER

CROSS-REFERENCE TO RELATED APPLICATION

Pursuant to 35 U.S.C. §119(a), this application claims the benefit of earlier filing date and right of priority to Korean Design Application No. 30-2009-0003195, filed on Jan. 23, 2009, the content of which is incorporated by reference herein in its entirety.

FIELD OF THE INVENTION

The present invention relates to a wireless speaker, and particularly, to a wireless speaker capable of outputting sound by receiving a wireless signal.

DISCUSSION OF THE RELATED ART

A wireless speaker is configured to output sound by receiving a wireless signal from playback devices such as an MP3 player, a portable terminal, a computer, and a television. A wire for connecting the speaker and the playback device to each other is not required. This may enable the speaker to have a simple design, and allows the speaker to not be influenced by other devices in an installation position.

However, the wireless speaker has a fixed shape or configuration. This may cause the spatial utilization and adaptability of the wireless speaker to be degraded.

SUMMARY OF THE INVENTION

Therefore, an object of the present invention is to provide a wireless speaker capable of implementing various structures according to spatial situations or selections.

To achieve these and other advantages, and in accordance with the purpose of the present invention as embodied and described herein, there is provided an apparatus that includes a first rod-shaped body, a second rod-shaped body, and a first hinge unit configured to rotatably couple the first rod-shaped body with the second rod-shaped body. The first rod-shaped body includes a first speaker positioned on a first longitudinal side thereof. The first rod-shaped body is structured to include at least one curved portion proximate to a first end thereof. The second rod-shaped body includes a second speaker positioned on a second longitudinal side thereof. The second rod-shaped body is structured to include at least one curved portion proximate to a first end thereof. The first hinge unit is positioned between the first rod-shaped body and the second rod-shaped body, such that an end of the at least one curved portion of the first rod-shaped body faces an end of the at least one curved portion of the second rod-shaped body to form a continuous body having an axis therethrough. The first hinge unit permits relative rotational movement between the first and second rod-shaped bodies.

In another aspect, a body assembly for a wireless speaker includes first and second rod-shaped bodies, each including at least one curved portion. The body assembly also includes at least one of a playback device or a short-range communication unit for wireless communication with a portable terminal embedded within one of the first or second rod-shaped bodies. Additionally, the body assembly includes a first hinge unit configured to rotatably couple the first and second rod-shaped bodies such that an end of the at least one curved portion of the first rod-shaped body faces an end of the at least one curved portion of the second rod-shaped body to form a continuous body having an axis therethrough. The first hinge permits relative rotational movement between the first and second rod-shaped bodies.

In a further aspect, an apparatus includes a first rod-shaped body and a second rod-shaped body. Each of the first and second rod-shaped bodies includes a speaker on a longitudinal side thereof, and an end surface. The first and second rod-shaped bodies are coupled to each other at the end surfaces thereof and are rotatable relative each other about an axis. In one aspect, the first and second rod-shaped bodies are rotatable relative each other about an axis perpendicular to the end surface of the first rod-shaped body and the end surface of the second rod-shaped body.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Description will now be given in detail of the present invention, with reference to the accompanying drawings.

Hereinafter, a wireless speaker according to the present invention will be explained in more detail with reference to the attached drawings. The suffixes attached to components of the wireless speaker, such as 'module' and 'unit' or 'portion' were used for facilitation of the detailed description of the present invention. Therefore, the suffixes do not have different meanings from each other.

Figure 1:
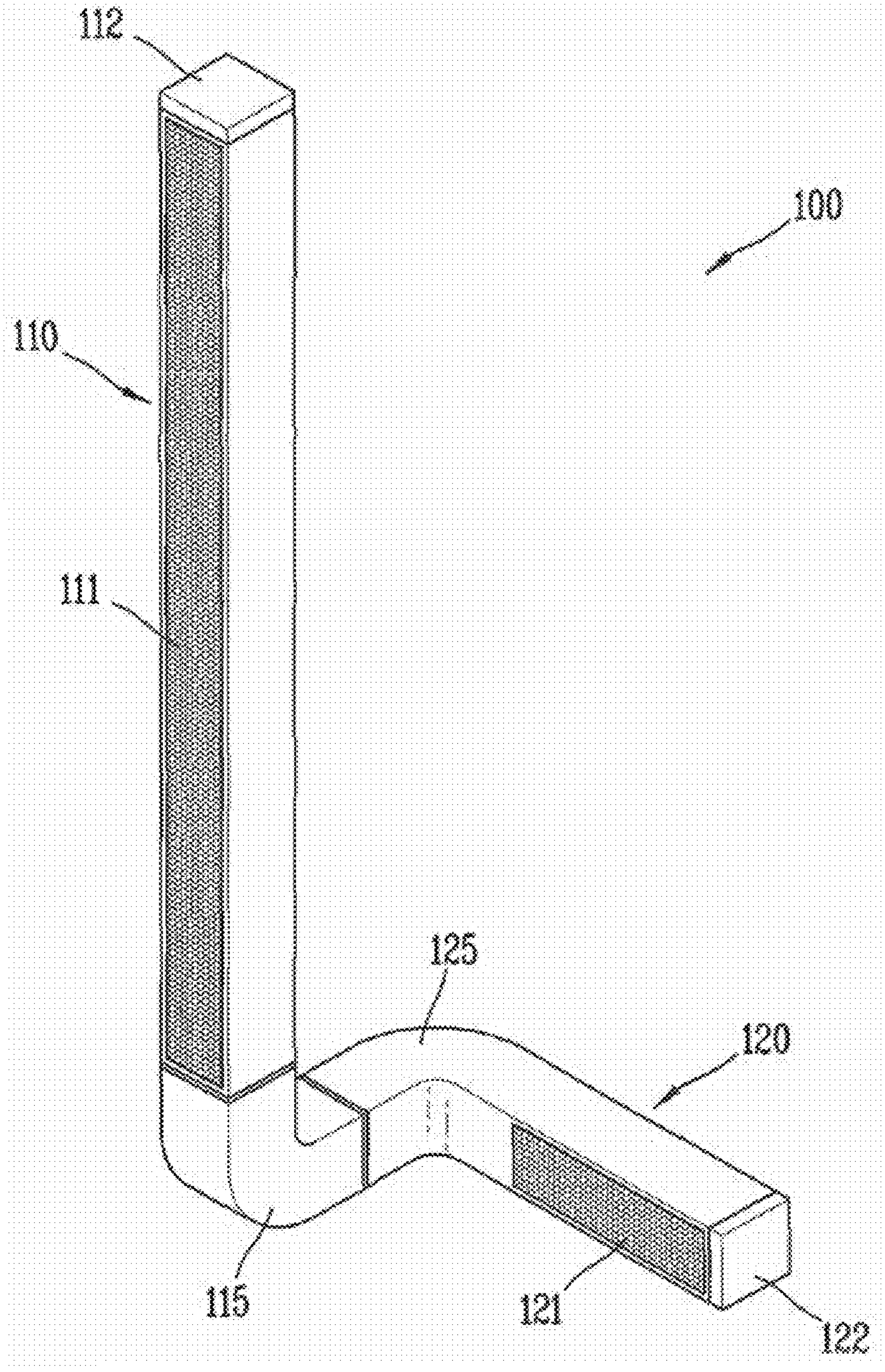
FIG. 1 is a perspective view of a wireless speaker according to an embodiment of the present invention.

FIG. 1 is a perspective view of a wireless speaker according to the present invention.

Referring to FIG. 1, the wireless speaker 100 includes a rod-shaped body assembly that forms the appearance thereof. The body assembly includes a plurality of curved portions and rotation connection points, thereby allowing the wireless speaker to implement various postures. For example, it seems that the short part of the body assembly contacts the floor, whereas the long part thereof stands upright.

Figure 2:
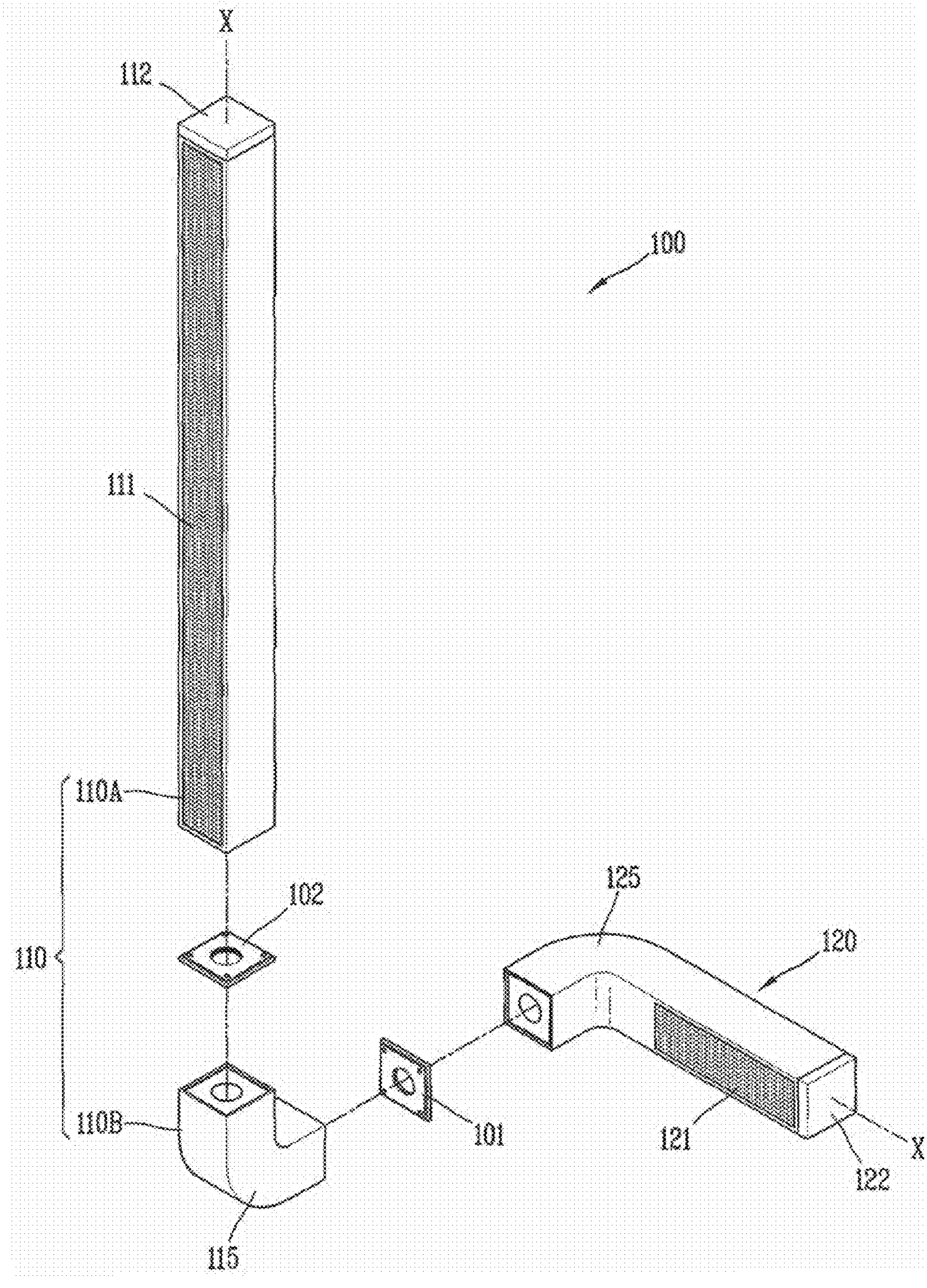
FIG. 2 is an exploded perspective view of the wireless speaker according to an embodiment of the present invention.

FIG. 2 is an exploded perspective view of the wireless speaker according to the present invention.

Referring to FIG. 2, the body assembly includes a first rod-shaped body 110 having a first speaker 111 positioned on a first outer longitudinal side thereof, and a second rod-shaped body 120 having a second speaker 121 positioned on a second outer longitudinal side thereof. The first and second rod-shaped bodies 110, 120 are coupled to each other such that an end of the first rod-shaped body 110 faces an end of the second rod-shaped body 120 to form a continuous body along an axis (X-X), and the second rod-shaped body is configured to be rotatable about the axis (X-X) with respect to the first rod-shaped body by a first hinge unit mounted therebetween. A first hinge unit 101 is provided at the contact portion between the first and second rod-shaped bodies 110, 120 such that the first rod-shaped body 110 is rotatable with respect to the second rod-shaped body 120 about the axis (X-X).

The first and second rod-shaped bodies 110, 120 are structured to include at least one curved portion 115, 125, respectively, proximate to first ends thereof. As the first rod-shaped body 110 is rotated with respect to the second rod-shaped body 120 by the curved portions 115, 125, the wireless speaker 100 may form various shapes.

The first hinge unit 101 is configured to rotatably couple the first rod-shaped body 110 with the second rod-shaped body 120, such that an end of the at least one curved portion of the first rod-shaped body faces an end of the at least one curved portion of the second rod-shaped body. In this manner, the first and second rod-shaped bodies 110, 120 form a continuous body having the axis (X-X) therethrough. The hinge unit 101 permits relative rotational movement between the first rod-shaped body 110 and the second rod-shaped body 120.

The first and second rod-shaped bodies 110, 120 may be formed to be easily made to stand upright or to be laid on the floor. Referring to FIG. 1, the first and second rod-shaped bodies 110, 120 are formed to have substantially rectangular longitudinal sides. However, the first and second rod-shaped bodies 110, 120 may be formed to have substantially cylindrical or other shape of longitudinal surfaces.

The first rod-shaped body 110 includes a plurality of sub-bodies 110A, 1108 coupled to each other along the axis (X-X) so as to be rotatable about the axis (X-X). Referring to FIG. 2, the first rod-shaped body 110 includes the first sub-body 110A and the second sub-body 1108. The first and second sub-bodies 110A, 1108 are configured to be rotatable by a second hinge unit 102 about the axis (X-X).

The second hinge unit 102 may be configured to be locked at a specific angle after being rotated by a predetermined angle. For example, the second hinge unit 102 may be configured so that the first sub-body 110A can be locked with respect to the second sub-body 1108 at intervals about the axis (X-X), such as about 90° intervals.

Referring to FIG. 1, the first and second rod-shaped bodies 110, 120 may be formed to include substantially straight portions that extend from the curved portions 115, 125, respectively. The first and second rod-shaped bodies 110, 120 are curved at about 90° angles at the respective curved portions 115, 125. Therefore, when the first rod-shaped body 110 is laid on the floor, main parts of the second rod-shaped body 120 may stand upright. Alternatively, when the second rod-shaped body 120 is laid on the floor, main parts of the first rod-shaped body 110 may stand upright.

The first hinge unit 101 and the second hinge unit 102 may be configured to be locked at intervals, such as about 90° intervals. For this, each of the first hinge unit 101 and the second hinge unit 102 may include a cam means and a spring member. Cam means and spring members that are known in the art may be used. The first hinge unit 101 and the second hinge unit 102 are provided with passage holes to which wiring connectors are connected.

The first and second rod-shaped bodies 110, 120 may be formed to have lengths different from each other, thereby implementing various shapes in a combination manner.

The first and second speakers 111, 121 implement a stereo effect via a distance therebetween. According to the positions of the first and second rod-shaped bodies 110, 120, various position combinations between the first and second speakers 111, 121 may be implemented. Referring to FIG. 1, the first and second speakers 111, 121 are positioned so as to face a front side. However, the first speaker 111 may face a direction different from that of the second speaker 121 by rotating the first sub-body 110A of the first rod-shaped body 110. The directions and arrangements of the first and second speakers 111, 121 may be varied according to conditions of the space where the wireless speaker 100 is installed.

First and second light emitting units 112, 122 for implementing illumination effects in various modes of the wireless speaker 100 are provided proximal to second ends of first and second rod-shaped bodies 110, 120, respectively, opposite the first ends at the curved portions of the first and second rod-shaped bodies. The light emitting units 112, 122 may be implemented as illumination means, such as LEDs or OLEDs, and may be configured to implement various color effects. The light emitting units 112, 122 may be controlled so as to allow a user to recognize the current mode of the wireless speaker 100, or to provide visual information to the user when outputting sound, or to implement indoor illumination effects. Furthermore, the light emitting units 112, 122 may be configured to implement various visual effects by being turned on and off or to change colors according to modes of the light emitting units.

Figure 3:
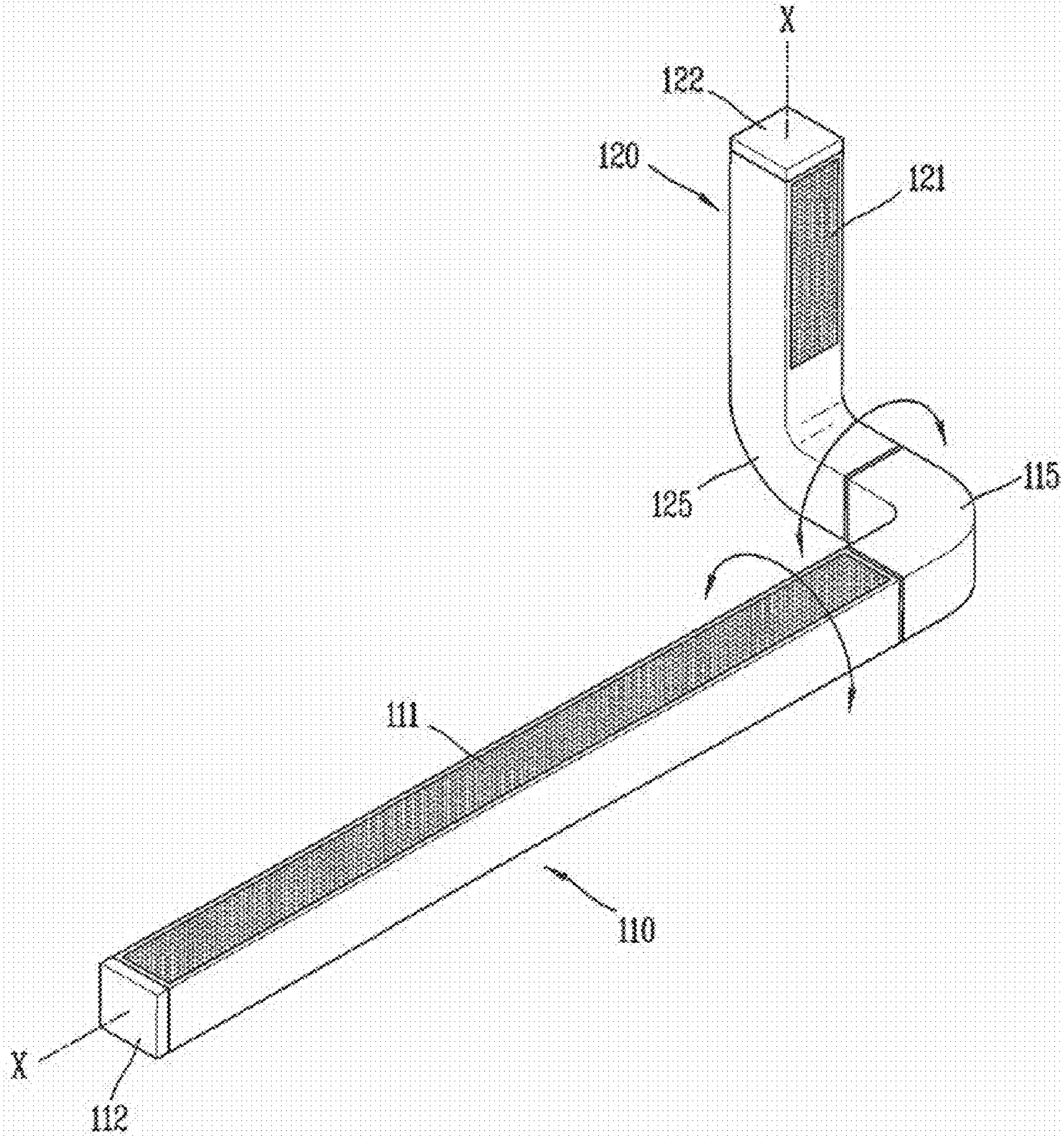
FIGS. 3 to 5 are perspective views showing different postures of the wireless speaker according to an embodiment of the present invention.
Figure 4:
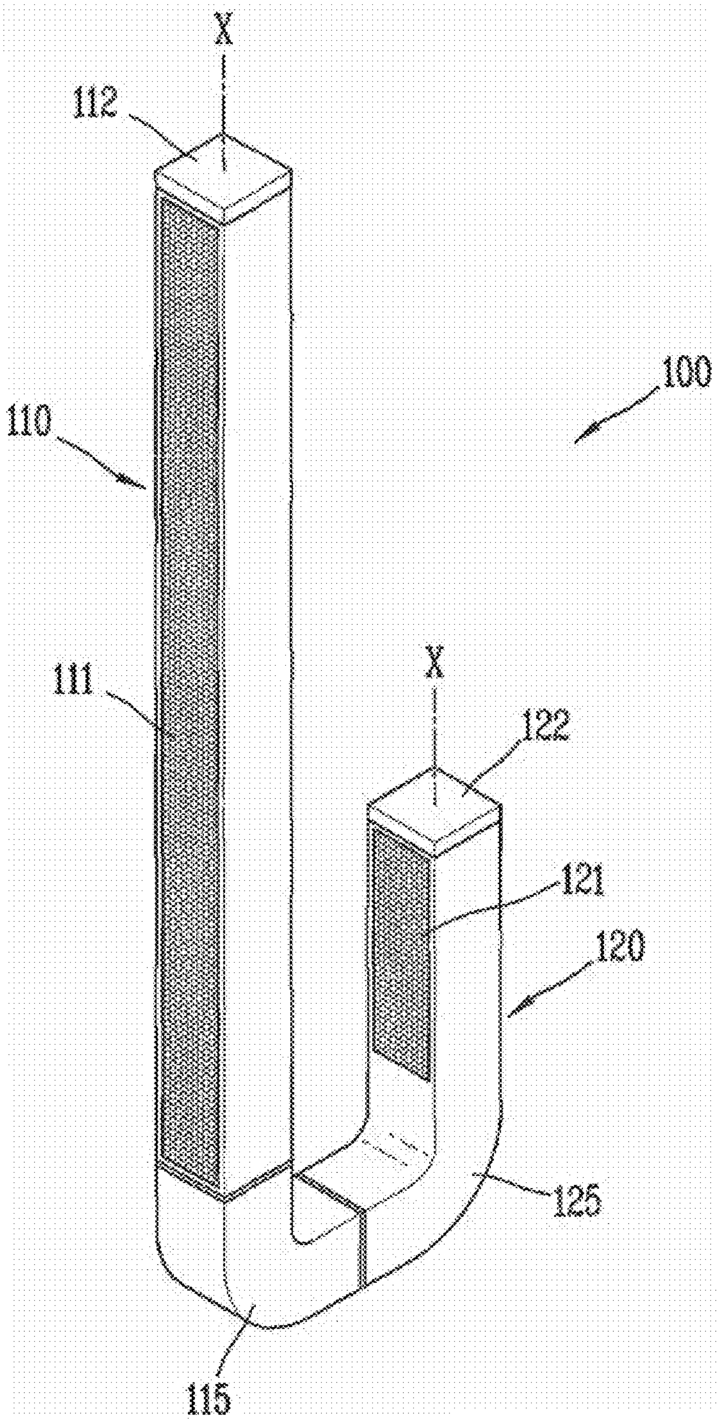
Figure 5:
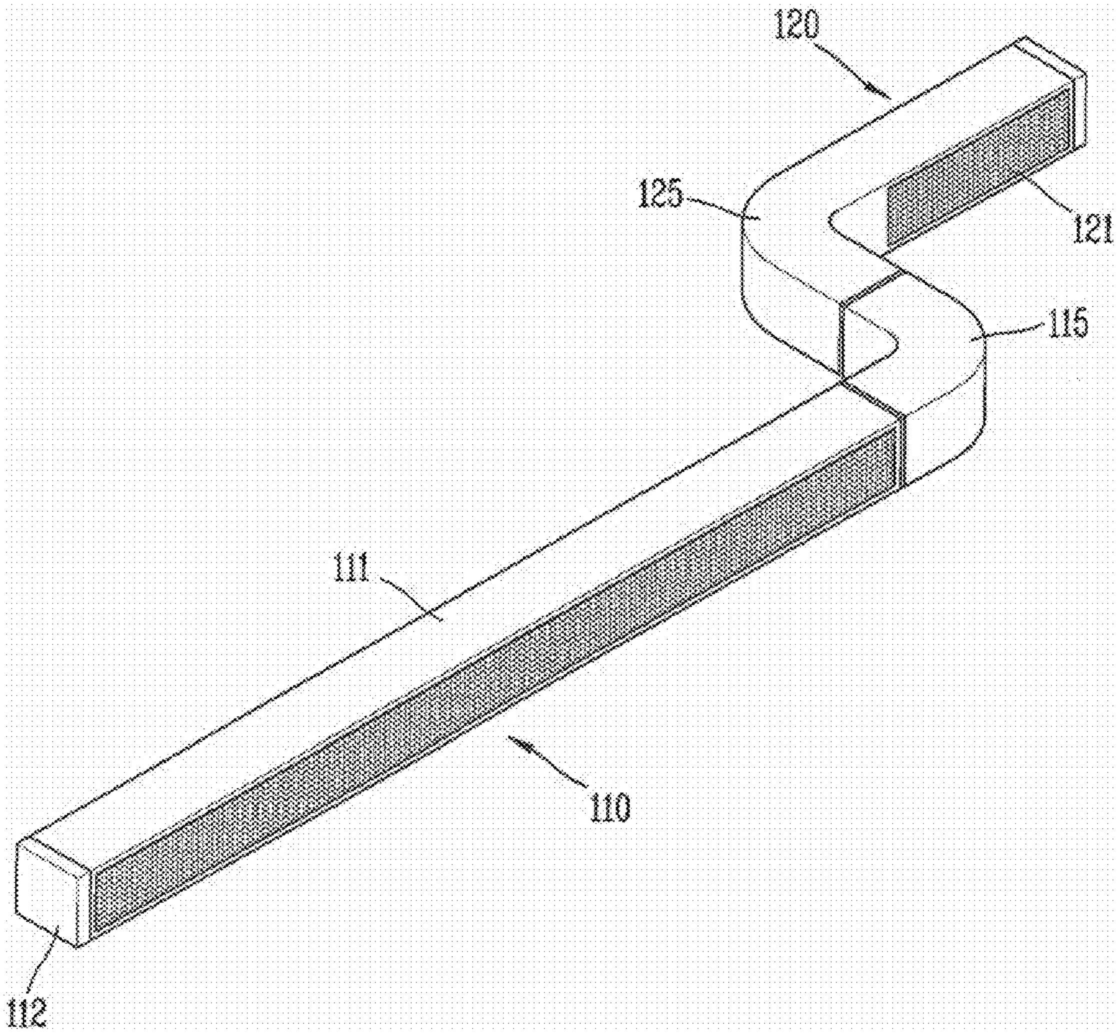

FIGS. 3 to 5 are perspective views showing different postures of the wireless speaker according to the present invention.

Referring to FIG. 3, the first rod-shaped body 110 is laid on the floor differently from FIG. 1, whereas the second rod-shaped body 120 stands upright. The first speaker 111 is positioned to face up. However, the first speaker 111 may be positioned to face the front or rear side.

FIG. 4 shows that the first rod-shaped body 110 of FIG. 3 is rotated by 90° centering around the first hinge unit 101, thus to be made to stand upright. This 'U'-shaped configuration may allow the wireless speaker 100 to be mounted on a hanger.

FIG. 5 shows that both the first and second rod-shaped bodies 110, 120 are laid on the floor. Here, the direction of the first speaker 111 may be toward the upper side by rotating the first sub-body 110A of the first rod-shaped body 110.

Figure 6:
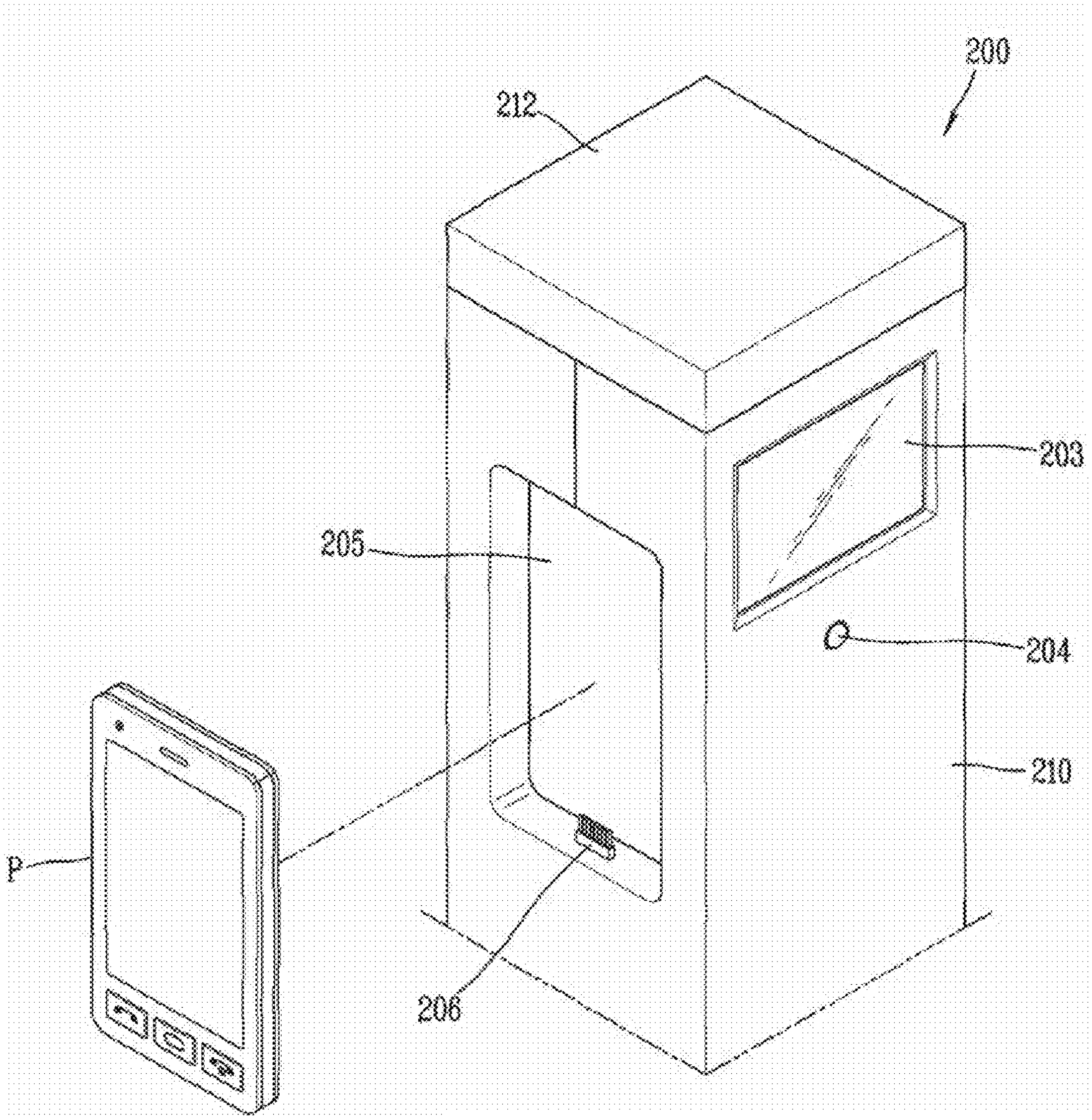
FIG. 6 is a perspective view of a wireless speaker according to an embodiment of the present invention.

FIG. 6 is a perspective view of a wireless speaker 200 according to another embodiment of the present invention.

Referring to FIG. 6, the wireless speaker 200 comprises a charging holder 205 configured to secure a portable terminal (P) therein on a rear surface of a body 210. The charging holder 205 may be provided on at least one of the first and second rod-shaped bodies 110, 120. A connector 206 for charging a battery of the portable terminal (P) is installed at the charging holder 205. Since an additional charger needs not be installed, the spatial appearance is enhanced.

A display unit 203 for displaying visual information, or an infrared ray receiving module 204 for performing a remote control by infrared rays, etc. may be provided at the wireless speaker 200.

Figure 7:
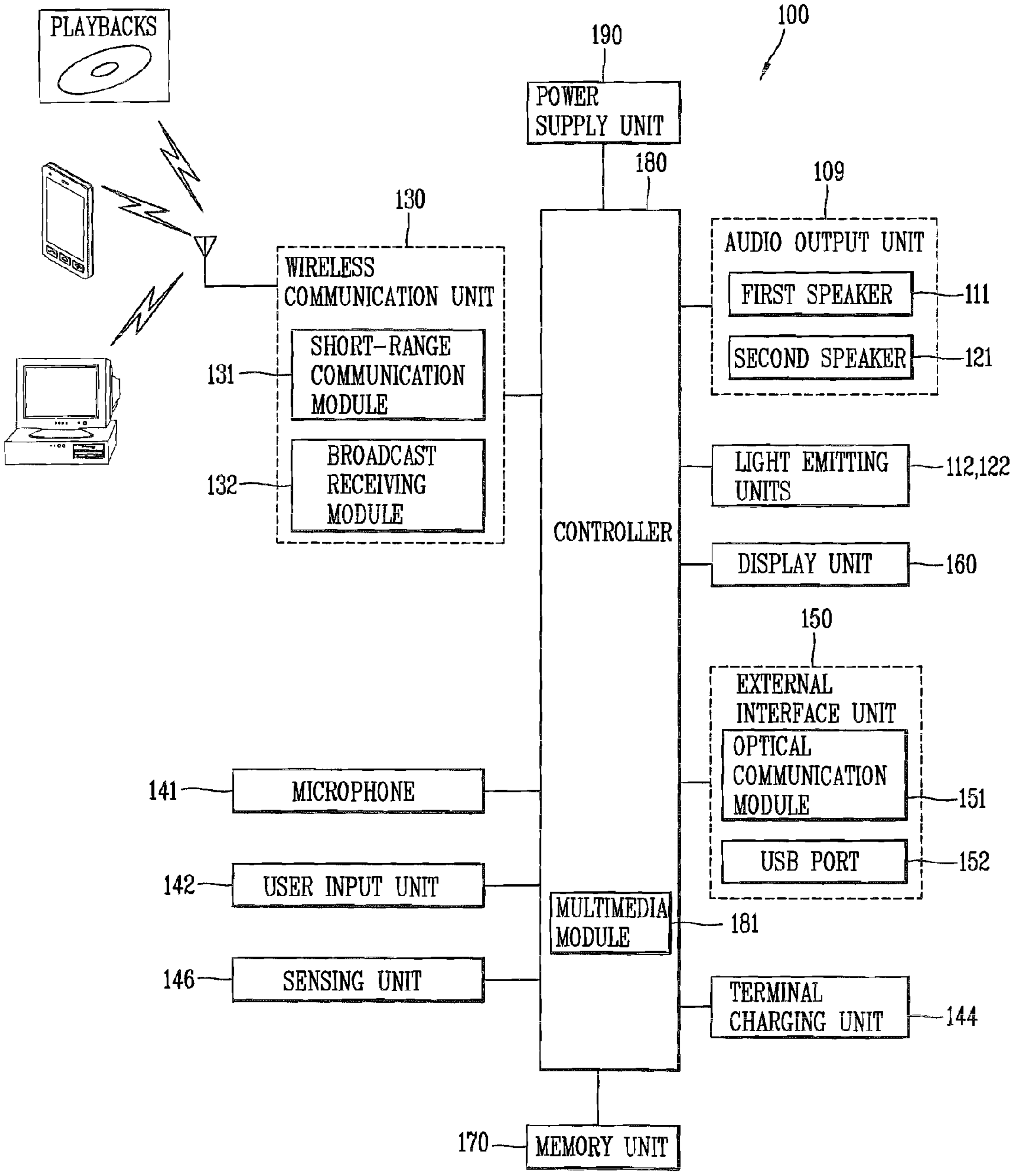
FIG. 7 is a block diagram of the wireless speaker according to an embodiment of the present invention.

FIG. 7 is a block diagram of the wireless speaker according to the present invention.

The wireless speaker 100 may comprise a wireless communication unit 130, a microphone 141, a user input unit 142, an audio output unit 109, light emitting units 112, 122, a display unit 160, a terminal charging unit 144, a memory unit 170, an external interface unit 150, a controller 180, a power supply unit 190, etc. FIG. 7 shows the wireless speaker having various components. However, the number of the components of the wireless speaker may be greater than or fewer than the number of the components shown in FIG. 7.

Hereinafter, each component of the wireless speaker will be explained in more detail.

The wireless communication unit 130 may include one or more components that permits wireless communication between the wireless speaker 100 and an external device, such as a playback device, a portable terminal, a computer or a TV. For example, the wireless communication unit 130 may include a short-range communication module 131, a broadcast receiving module 132, etc. The playback device or the short-range communication 131 module for wireless communication with a portable terminal may be provided at the first rod-shaped body 110 or at the second rod-shaped body 120.

The short-range communication module 131 serves as a module for short-range communication. Suitable technologies for implementing this module include radio frequency identification (RFID), infrared data association (IrDA), ultra-wideband (UWB), as well at the networking technologies commonly referred to as Bluetooth® and ZigBee®, to name a few.

The broadcast receiving module 132 receives a broadcast signal and/or broadcast associated information from an external broadcast managing entity via a broadcast channel. The broadcast channel may include a satellite channel and/or a terrestrial channel. In addition, the broadcast managing entity generally refers to a system that transmits a broadcast signal and/or broadcast associated information. Examples of broadcast associated information include information associated with a broadcast channel, a broadcast program, a broadcast service provider, etc. For example, broadcast associated information may include an electronic program guide (EPG) of digital multimedia broadcast (DMB) and electronic service guide (ESG) of digital video broadcast-handheld (DVB-H). In addition, the broadcast signal may be implemented as a TV broadcast signal, a radio broadcast signal, and/or a data broadcast signal, among others. The broadcast signal may further include a broadcast signal combined with a TV or radio broadcast signal. The broadcast signal and/or broadcast-related information received through the broadcast receiving module 132 may be stored in the memory unit 170.

The microphone 141 may be coupled to at least one of the first or second rod-shaped bodies 110, 120. The microphone 141 may be utilized in a speaker phone mode in a state that the wireless speaker 100 is connected to a portable terminal or a fixed terminal. That is, a user's voice may be inputted through the microphone 141 of the wireless speaker 100 without the user directly using or holding the portable or fixed terminal. Then, the user's voice may be transmitted to another party through the portable or fixed terminal by the short-range communication module 131. Next, the user's voice received by the portable or fixed terminal is transmitted to the wireless speaker 100 by the short-range communication module 131, and then is outputted to the first speaker 111 and/or the second speaker 121 to perform a call. In the speakerphone mode, the controller 180 may control visual information to be provided through the light emitting units 112, 122 or the display unit 160. The microphone 141 may include assorted noise removing algorithms to remove noise generated in the course of receiving the external audio signal.

The user input unit 142 generates input data so as to allow the user to control the operation of the terminal. Examples of such user input unit 142 include a keypad, a dome switch, a touchpad (e.g., static pressure/capacitance), a jog wheel and a jog switch. When the touch pad is provided in conjunction with the display unit 160, which will be explained later, to form a layered structure, it may be referred to as a 'touch screen.'

A sensing unit 146 detects a status of the wireless speaker 100, thereby generating a sensing signal to control the operation of the wireless speaker 100. For example, when the first rod-shaped body 110 is rotated, the sensing unit 146 detects the rotation, thus to transmit the information to the controller 180. The controller 180 may provide visual or auditory signals for informing the user of the rotation of the first rod-shaped body 110 through the display unit 160 or the audio output unit 109.

The external interface unit 150 performs an interface with an external device connected to the wireless speaker 100. The external interface unit 150 may include various I/O ports, such as an optical communication module 151 or a USB port 152.

The wireless speaker 100 may further comprise the terminal charging unit 144 for charging the portable terminal. The terminal charging unit 144 may supply power to a battery of the portable terminal upon checking that the portable terminal has been mounted to the terminal charging unit 144, or may provide received status information of the battery to the controller 180. The controller 180 may provide information relating to a charged status of the portable terminal to the user in an auditory or visual manner.

The wireless speaker 100 may comprise the light emitting units 112, 122 for implementing illumination effects in various modes. The light emitting units 112, 122 may be implemented as illumination means such as LEDs or OLEDs, and may be configured to implement various color effects. The light emitting units 112, 122 may be controlled so as to allow the user to recognize the current mode of the wireless speaker 100, or to provide visual information to the user when outputting sound, or to implement indoor illumination effects. Furthermore, the light emitting units 112, 122 may be configured to implement various visual effects by being turned on and off. Algorithms or programs for controlling the light emitting units 112, 122 may be stored in the memory unit 170.

The audio output unit 109 includes the first and second speakers 111, 121, and output multimedia sound received from an external device, such as a playback device or a portable terminal, calling sound, or audio data stored in the memory unit 170. The first and second speakers 111, 121 may be controlled individually of each other, and may be configured to implement stereo effects.

The display unit 160 outputs information processed by the wireless speaker 100. For example, when the wireless speaker 100 outputs multimedia sound, the display unit 160 displays information relating to the multimedia, User Interface (UI) or Graphic User Interface (GUI) for executing specific functions. When the wireless speaker 100 is in a calling mode through the portable terminal, the display unit 160 displays images received from the portable terminal, UI or GUI.

Further, when the display unit 160 is implemented as a touch screen in cooperation with a touchpad, it may be used as both an input device and an output device. In addition, the display unit 160 may be implemented using display technologies including, for example, a liquid crystal display (LCD), a thin film transistor-liquid crystal display (TFT-LCD), an organic light-emitting diode display (OLED), a flexible display and a three-dimensional display (3D display).

The memory unit 170 may serve to store programs for processing and controlling the controller 180, or to temporarily store input/output data.

The controller 180 typically controls the overall operations of the portable terminal. For example, the controller 180 performs the control and processing associated with voice calls, data communications, instant message communications, video calls, camera operations and recording operations. The controller 180 may also include a multimedia module 181 for providing multimedia playback functions. The multimedia module 181 may be configured as part of the controller 180, or may be implemented as a separate component.

The power supply unit 190 provides external or internal power under control of the controller 180, thereby providing power necessary to operate each component.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are intended to be embraced by the appended claims.

What is claimed is:

1. An apparatus, comprising:

a first rod-shaped body comprising a first speaker positioned on a first longitudinal side of the first rod-shaped body, wherein the first rod-shaped body is structured to include at least one curved portion proximate to a first end thereof; and a second rod-shaped body comprising a second speaker positioned on a second longitudinal side of the second rod-shaped body, wherein the second rod-shaped body is structured to include at least one curved portion proximate to a first end thereof, and a first hinge unit configured to rotatably couple the first rod-shaped body with the second rod-shaped body, such that an end of the at least one curved portion of the first rod-shaped body faces an end of the at least one curved portion of the second rod-shaped body to form a continuous body having an axis therethrough, wherein the first hinge unit permits relative rotational movement between the first rod-shaped body and the second rod-shaped body, wherein cross-sections of the first rod-shaped body along the axis and perpendicular to the axis and cross-sections of the second rod-shaped body along the axis and perpendicular to the axis are substantially the same, and wherein the first hinge unit couples the first rod-shaped body and second rod-shaped body such that the formed continuous body has the substantially the same cross-section along the axis.

2. The apparatus of claim 1, wherein the first rod-shaped body or the second rod-shaped body comprises a plurality of sub-bodies rotatably coupled to each other along the axis.

3. The apparatus of claim 2, wherein the first rod-shaped body comprises a second hinge unit disposed between the sub-bodies to permit relative rotational movement between the sub-bodies.

4. The apparatus of claim 3, wherein the second hinge unit is configured to be locked at intervals of about 90° about the axis.

5. The apparatus of claim 1, wherein:

the first rod-shaped body comprises a substantially straight portion that extends from the at least one curved portion of the first rod-shaped body; and the second rod-shaped body comprises a substantially straight portion that extends from the at least one curved portion of the second rod-shaped body.

6. The apparatus of claim 1, wherein:

the at least one curved portion of the first rod-shaped body is structured to form an approximately 90° angle; and the at least one curved portion of the second rod-shaped body is structured to form an approximately 90° angle.

7. The apparatus of claim 6, wherein the first hinge unit is configured to be locked at intervals of about 90° about the axis.

8. The apparatus of claim 1, wherein each of the first rod-shaped body and the second rod-shaped body comprises substantially rectangular longitudinal sides.

9. The apparatus of claim 1, wherein a length of the first rod-shaped body differs from a length of the second rod-shaped body.

10. The apparatus of claim 1, further comprising:

a first light emitting unit coupled proximate to a second end of the first rod-shaped body, the second end of the first rod-shaped body being opposite to the first end of the first rod-shaped body, and a second light-emitting unit coupled proximate to a second end of the second rod-shaped body, the second end of the second rod-shaped body being opposite to the first end of the second rod-shaped body.

11. The apparatus of claim 10, wherein the first light emitting unit and the second light emitting unit are configured to be turned on and off, or to change colors based on modes thereof.

12. The apparatus of claim 1, wherein a microphone is coupled to the first rod-shaped body or the second rod-shaped body.

13. The apparatus of claim 1, wherein a charging holder configured to secure a portable terminal therein is provided on the first rod-shaped body or the second rod-shaped body.

14. The apparatus of claim 1, wherein a playback device or a short-range communication module for wireless communication with a portable terminal is provided at the first rod-shaped body or at the second rod-shaped body.

15. A body assembly for a wireless speaker, comprising:

a first rod-shaped body comprising at least one curved portion;

a second rod-shaped body comprising at least one curved portion;

at least one of a playback device or a short-range communication unit for wireless communication with a portable terminal embedded within the first rod-shaped body or the second rod-shaped body; and a first hinge unit configured to rotatably couple the first rod-shaped body with the second rod-shaped body such that an end of the at least one curved portion of the first rod-shaped body faces an end of the at least one curved portion of the second rod-shaped body to form a continuous body having an axis therethrough, wherein the first hinge unit permits relative rotational movement between the first rod-shaped body and the second rod-shaped body, wherein cross-sections of the first rod-shaped body along the axis and perpendicular to the axis and cross-sections of the second rod-shaped body along the axis and perpendicular to the axis are substantially the same, and wherein the first hinge unit couples the first rod-shaped body and second rod-shaped body such that the formed continuous body has the substantially the same cross-section along the axis.

* * * * *